US012227261B2

(12) United States Patent
Feuz et al.

(10) Patent No.: US 12,227,261 B2
(45) Date of Patent: *Feb. 18, 2025

(54) GENERATING AND/OR PRIORITIZING PRE-CALL CONTENT FOR RENDERING WHEN AWAITING ACCEPTANCE OF AN INCOMING CALL

(71) Applicant: GOOGLE LLC, Mountain View, CA (US)

(72) Inventors: Sandro Feuz, Zurich (CH); Thomas Deselaers, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,080

(22) Filed: Oct. 9, 2023

(65) Prior Publication Data
US 2024/0040037 A1 Feb. 1, 2024

Related U.S. Application Data

(63) Continuation of application No. 17/340,768, filed on Jun. 7, 2021, now Pat. No. 11,831,804, which is a (Continued)

(51) Int. Cl.
*H04M 3/436* (2006.01)
*B60T 7/08* (2006.01)
(Continued)

(52) U.S. Cl.
CPC ................ *B62L 3/02* (2013.01); *B60T 7/085* (2013.01); *G01D 5/142* (2013.01); *G06F 3/017* (2013.01);
(Continued)

(58) Field of Classification Search
CPC ...... B62L 3/02; B60T 7/085; B60T 2270/604; B60T 1/10; B60T 11/16; B60T 7/102;
(Continued)

(56) References Cited

U.S. PATENT DOCUMENTS 5,991,367 A  11/1999 Robuck
6,218,947 B1  4/2001 Sutherland
(Continued)

FOREIGN PATENT DOCUMENTS

CN  103929519  7/2014
CN  108347514  7/2018
(Continued)

OTHER PUBLICATIONS

Kim Sung Soo (KR 20140020671 A) >>> Mobile Terminal and Incomming Call Accept Determining Method Thereof (see title) (Year: 2014).*
(Continued)

*Primary Examiner* — Meless N Zewdu
(74) *Attorney, Agent, or Firm* — Gray Ice Higdon

(57) ABSTRACT

Implementations set forth herein relate to generating a pre-call analysis for one or more users that are receiving and/or initializing a call with one or more other users, and/or prioritizing pre-call content according to whether security-related value was gleaned from provisioning certain pre-call content. One or more machine learning models can be employed for determining the pre-call content to be cached and/or presented prior to a user accepting a call from another user. Feedback provided before, during, and/or after the call can be used as a basis from which to prioritize certain content and/or sources of content when generating pre-call content for a subsequent call. Other information, such as contextual data (e.g., calendar entries, available peripheral devices, location, etc.) corresponding to the previous call
(Continued)

and/or the subsequent call, can also be used as a basis from which to provide a pre-call analysis.

19 Claims, 8 Drawing Sheets

Related U.S. Application Data continuation of application No. 16/339,235, filed as application No. PCT/US2019/013752 on Jan. 16, 2019, now Pat. No. 11,032,418.

(60) Provisional application No. 62/785,263, filed on Dec. 27, 2018.

(51) Int. Cl.
  *B62L 3/02* (2006.01)
  *G01D 5/14* (2006.01)
  *G06F 3/01* (2006.01)
  *G06N 20/00* (2019.01)
  *H04M 3/42* (2006.01)

(52) U.S. Cl.
  CPC ........ *G06N 20/00* (2019.01); *H04M 3/42042* (2013.01); *H04M 3/4365* (2013.01); *H04M 2203/25* (2013.01)

(58) Field of Classification Search
  CPC .......... G01D 5/142; G01D 5/145; G01D 5/14; G06F 3/017; G06F 3/01; G06N 20/00; G06N 20/20; H04M 3/42042; H04M 3/4365; H04M 2203/25; H04M 1/575; H04M 1/724; H04M 1/72484; H04M 3/436; H04M 1/42059; H04M 1/57; H04M 3/42; H04M 1/573; H04M 1/56; H04M 1/576; H04M 1/578; H04M 1/82; H04M 3/2281; H04M 3/42025; H04M 3/42034; H04M 3/42093; H04M 3/4211; H04M 3/42119; H04M 3/4288; H04M 3/432; H04M 3/428; H04M 3/4281; H04M 1/27463; H04M 1/27467; H04M 1/2753; H04M 1/07; B62K 23/06; F16D 61/00; H04W 4/16; H04W 4/18; H04W 88/02; H04W 88/00
  See application file for complete search history.

(56) References Cited

U.S. PATENT DOCUMENTS

| | | | |
|---|---|---|---|
| 6,748,068 B1* | 6/2004 | Walsh et al. | 379/142.03 |
| 7,068,767 B2* | 6/2006 | Moss et al. | 379/142.01 |
| 7,283,969 B1 | 10/2007 | Marsico | |
| 7,940,908 B2* | 5/2011 | Sprigg et al. | |
| 8,311,190 B2 | 11/2012 | Caceres | |
| 8,429,103 B1* | 4/2013 | Aradhye et al. | 706/12 |
| 8,472,604 B2 | 6/2013 | Brahm | |
| 8,548,447 B1 | 10/2013 | Kirchhoff | |
| 8,553,864 B2 | 10/2013 | Chatterjee | |
| 9,031,210 B2 | 5/2015 | Charugundla | |
| 9,154,597 B2 | 10/2015 | Cook | |
| 9,553,985 B2 | 1/2017 | Cohen | |
| 9,736,300 B2 | 8/2017 | Cook | |
| 9,867,020 B2 | 1/2018 | Khawand | |
| 10,009,461 B2 | 6/2018 | Ansari | |
| 10,506,088 B1* | 12/2019 | Singh | H04M 1/274533 |
| 10,810,510 B2* | 10/2020 | Baracaldo et al. | G06N 20/00 |
| 11,032,418 B2* | 6/2021 | Feuz et al. | H04M 3/4365 |
| 2001/0036258 A1 | 11/2001 | Sugla | |
| 2003/0152198 A1 | 8/2003 | Price | |
| 2006/0148459 A1 | 7/2006 | Wolfman et al. | |
| 2009/0161845 A1 | 6/2009 | Adams et al. | |
| 2012/0065976 A1 | 3/2012 | Deng | |
| 2012/0134480 A1* | 5/2012 | Leeds et al. | 379/88.12 |
| 2012/0173373 A1* | 7/2012 | Soroca et al. | 705/26.3 |
| 2013/0222268 A1 | 8/2013 | Greisson et al. | |
| 2013/0324093 A1* | 12/2013 | Santamaria et al. | 455/414.1 |
| 2013/0331074 A1 | 12/2013 | Kim | |
| 2014/0177813 A1* | 6/2014 | Leeds et al. | H04M 3/42051 |
| 2015/0249742 A1 | 9/2015 | Li | |
| 2015/0256685 A1* | 9/2015 | Amberden | H04M 19/04 |
| 2016/0173685 A1* | 6/2016 | Lobo et al. | H04M 3/42068 |
| 2016/0330333 A1 | 11/2016 | Brown | |
| 2017/0054837 A1* | 2/2017 | Choi et al. | H04M 1/56 379/201.02 |
| 2017/0134571 A1 | 5/2017 | Ashtikar | |
| 2017/0148429 A1 | 5/2017 | Hayakawa | |
| 2018/0020093 A1* | 1/2018 | Bentitou et al. | H04M 3/4365 |
| 2018/0032997 A1 | 2/2018 | Gordon et al. | |
| 2018/0041635 A1 | 2/2018 | Li et al. | |
| 2018/0152558 A1 | 5/2018 | Chan | |
| 2018/0324297 A1* | 11/2018 | Kent et al. | H04M 3/436 |
| 2020/0162610 A1* | 5/2020 | VanBlon et al. | H04M 3/436 |
| 2021/0297530 A1 | 9/2021 | Feuz et al. | |
| 2021/0385325 A1* | 12/2021 | Tian | H04M 3/42068 |

FOREIGN PATENT DOCUMENTS

| | | |
|---|---|---|
| JP | 2002204311 | 7/2002 |
| JP | 2006033040 | 2/2006 |
| JP | 2014204441 | 10/2014 |
| JP | 2017097162 | 6/2017 |
| KR | 101601817 | 3/2016 |
| WO | 2020139406 | 7/2020 |

OTHER PUBLICATIONS

Borukhoff Stanislav (KR 20200053607 A) >>> Personalized Audio / Video Invitations For Phone Calls (see title) (Year: 2020).*

China National Intellectual Property Administration; Notice of Grant issued in Application No. 201980086900.3; 4 pages dated Jun. 30, 2023.

China National Intellectual Property Administration; Notification of Second Office Action issued in Application No. 201980086900.3; 14 pages dated Mar. 30, 2023.

Japanese Patent Office; Notice of Reasons for Rejection issued in Application No. 2021-537860; 18 pages; dated Oct. 31, 2022.

Korean Intellectual Property Office; Notice of Office Action issue in Application No. KR10-2021-7023379; 7 pages; dated Sep. 27, 2022.

Korean Intellectual Property Office; Allowance of Patent issue in Application No. KR10-2021-7023379; 3 pages; dated Nov. 18, 2022.

China National Intellectual Property Administration; Office Action issued in Application No. 201980086900.3; 27 pages dated Sep. 5, 2022.

Intellectual Property India; Examination Report issued in Application No. IN202127028176; 6 pages; dated Mar. 14, 2022.

European Patent Office; International Search Report and Written Opinion of Ser. No. PCT/US2019/013752; 13 pages; dated Jun. 3, 2019.

European Patent Office, Intention to Grant issued in Application No. 19704480.3; 47 pages; dated Dec. 6, 2023.

Intellectual Property India; Hearing Notice issued in Application No. IN202127028176; 2 pages; dated Apr. 12, 2024.

Japanese Patent Office; Notice of Reasons for Rejection issued in Application No. 2023-097187; 9 pages; dated Aug. 19, 2024.

* cited by examiner

GENERATING AND/OR PRIORITIZING PRE-CALL CONTENT FOR RENDERING WHEN AWAITING ACCEPTANCE OF AN INCOMING CALL

BACKGROUND

Wireless communications have enabled various users to spend boundless time communicating with each other through a variety of different modalities. Enabling users to communicate in this way can provide convenience, but can also expose certain users to security risks due to limitations of network communications. Oftentimes, a user may receive an incoming call from a number that they have no knowledge upon which to guide their decision to accept the incoming call. Should the incoming call be from a source associated with criminal activity and/or other distressing activity, any resources spent mediating the network connection would be wasted, as there may be no utility in participating in the call. For instance, when such calls occur regularly for a population of users, network bandwidth would be consumed by inconsequential calls, thereby causing other more important calls to be incidentally re-directed over the network.

When the user is familiar with a source of an incoming call, the user may accept the call under the assumption that the call will have some amount of utility to themselves or the source of the call. However, during the call, users will often refer to other sources of information, such as other applications and/or devices, in order to refresh their recollection of any subject matter relevant to the call. Such referencing of other sources external to the computing device that is actively participating in the phone call can prolong the call and cause multiple overlapping layers of network activity. For instance, a user that is attempting to access, during a call, information that is relevant to the call, can cause requests for data over a network that is the same as, or different from, the network handling the call. This can result in excess usage of bandwidth during the call and may, where the network is the same, degrade the quality of the call. Moreover, the call can be prolonged as a result of the user needing to access, during the call, the information that is relevant to the call.

SUMMARY

Implementations set forth herein relate to generating a pre-call analysis for one or more users that are receiving and/or initializing a call with one or more other users; and/or prioritizing pre-call content according to whether security-related value was gleaned from provisioning certain pre-call content. In some implementations, a context of a user can be characterized by data, which can be accessed in furtherance of determining pre-call content that should be presented to the user, should the user receive a call while being subject to the context. The data characterizing the context can be systematically determined before, during, and/or after a phone call is received by a user from another user and/or device. For instance, when an activity associated with both a first user and a second user is performed, contextual data can be generated in response to the activity being performed. The activity can be, but is not limited to, the first user creating a calendar event in which the second user is identified as an invitee. Subsequent to the activity (e.g., the first user creating the calendar event) being performed, the second user can initialize a phone call to the first user, and when the call is awaiting acceptance by the first user, the first user can be presented with at least a portion of, or a synopsis of, the contextual data. This can eliminate the need for the user to prolong their phone call or to use call bandwidth by referencing the contextual data via some separate modality (e.g., an interface of another computing device, or another application) during the phone call. The method further provides an improved user interface which takes, as input, the signal of the received phone call and uses the input as a trigger to cause a computing system to fetch relevant data to provide to the user in advance of the user receiving the phone call. In addition, this can preserve processor resources, as the user may no longer need to invoke a separate application for referencing relevant information during a call, but, rather, can rely on pre-call content for refreshing their recollection prior to accepting the call. Additionally, when a user is travelling, for example using public or personal transport, while telephone signal may be available over the duration of the route, access to suitable data connections (such as WiFi or cellular data connections) may be intermittent. As such, while it may be possible to take a telephone call, it may not be possible to obtain additional information at all points during the call. By pre-fetching pre-call content in advance of the call, there is an increased likelihood that information is available for use during the call.

In some implementations, a user interface may provide one or more dialog or menu options to facilitate a user to enable the fetching of pre-call content. In some implementations, fetching of pre-call content may be selectively enabled based upon one or more parameters selected by the user. For example, a menu option may be provided for a user to enable pre-call content to be fetched only during predetermined times of the day, only for certain contacts (or for anyone except certain contacts), when the user is within defined geographic boundaries, in dependence upon whether a user is moving (e.g. driving or on public transport), in dependence upon whether the user is currently using one or more other applications on the or another computing device, etc.

In some implementations, contextual data can be gleaned from various different sources (e.g., sources associated with different users) in order to aggregate data that can be used when prioritizing content for provisioning to a particular user that is receiving a related incoming call. For example, when one or more other users have limited their engagement with a particular call source because of apparent criminal and/or other distressing activity, pre-call provisioning of content that is based on such contextual data can put the user on notice that the source of the call has been associated with apparent criminal and/or other distressing activity. In this way, the particular user could similarly limit their engagement with the source of the incoming call.

In some implementations, and with explicit, prior permission from a user, dialog content of a call between the user and one or more other users can be a basis for provisioning pre-call content. Such dialog content can be used as a basis from which to assign and/or modify a priority of content data (and/or a source of content data) for provisioning to the user when the user is receiving and/or initializing a call with the one or more other users. As an example, when a first incoming call is awaiting acceptance from a user, an interface of a computing device can present the user with first content that is associated with a source of the incoming call and/or that is predicted to be relevant to the first incoming call. The user can participate in the first incoming call and dialog content of the first incoming call can be processed in furtherance of comparing a relevance of the first content to the dialog content. The processing can be undertaken in order to generate feedback for one or more trained machine learning models that can be used when generating data from which the pre-call provisioning of content is based. For instance, when the first content is determined to be relevant to the dialog content, a priority of the first content can be prioritized over second content, at least if the second content was previously assigned a priority that was higher than an assigned priority of the first content. Additionally, or alternatively, when the first content is determined to be irrelevant to the dialog content, the priority of the first content can be deprioritized relative to a previously assigned priority of the second content. As a result, when the user receives a subsequent incoming call from the other user, an assigned priority for each content of the first content and the second content can be used as a basis for rendering pre-call content corresponding to the second content, and/or the first content. In some implementations, the dialog content can optionally be based on an input from a single participant of the call. The input can be isolated such that only the single participant of the call, and no other input from other participants, is incorporated into the dialog content that is used when generating pre-call content. In some implementations, the dialog content based on input from a single participant can be transcribed and the transcribed input can be used as a basis from which to generate pre-call content. In some implementations, dialog content can be based on input from only those users that have previously provided explicit permission to have their inputs to a call be used as a basis from which to generate pre-call content. In other words, when dialog content is based on inputs from multiple users, pre-call content subsequently generated for those users will be based on inputs from different users.

In some implementations, relevance of pre-call content to an interaction between two or more users can be based on feedback provided by at least two users of the two or more users. The feedback can be, but is not limited to, gestures and/or other actions performed by a particular user: prior to the pre-call content being presented, while the pre-call content is being presented, during the call, and/or after the call. For example, pre-call content for a user can be rendered at a touch display panel of a computing device when the computing device, or another computing device, is awaiting acceptance of an incoming call from another user. While the pre-call content is rendered for the user, the user can provide a gesture to the touch display panel, indicating an interest in a certain portion of the pre-call content. In another example, an indication can be rendered of multiple possible types of pre-call content that may be retrieved when the computing device, or another computing device, is awaiting acceptance of an incoming call from another user. While the indication of possible pre-call content is rendered, the user can provide a gesture indicating an interest in a particular one of the types of pre-call content. The selected type of pre-call content may then be retrieved. Implementations set forth herein may facilitate continued and guided human-machine interaction in response to receipt of a call request. Furthermore, when the user and the other user are participating in the call, the other user can provide a natural language input to their other computing device, and the natural language input can have one or more correlations to the pre-call content. The pre-call content and dialog content of the call, with prior permission from the user and the other user, can be compared in order to identify the one or more correlations. Furthermore, the gesture input by the user and the natural language input by the other user can be considered positive feedback, from which the pre-call content can be assigned a priority and/or other pre-call content can be generated. For instance, prior to a subsequent call between the user and the other user, one or more learning models stored on the computing device (and/or a separate computing device) can be used to generate further pre-call content, and/or prioritize the previous pre-call content, based on the based on the positive feedback. As a result, when the subsequent call is initialized by the user and/or the other user, an interface of the computing device, and/or another interface of another computing device, can provide pre-call content based on the feedback from both the user and the other user.

In some implementations, pre-call content can be cached in memory of one or more computing devices and systematically adapted over time based on a variety of different factors. For instance, pre-call content can be generated for provisioning when a user is receiving an incoming call from another user, and the pre-call content can be generated prior to the incoming call, and adapted over time. The pre-call content can be adapted over time in furtherance increasing a probability that the pre-call content will be relevant to any subsequent call received from the other user. As an example, first pre-call content can be generated based on application data (e.g., a chat application) that characterizes an interaction between a user and another user. Therefore, should the user receive an incoming call initialized by the other user, the first pre-call content can be presented to the user in furtherance of refreshing a recollection of the user prior to accepting the incoming call. However, should the user engage with another application (e.g., a calendar application) in order to generate other data that provides some correspondence between the user and the other user, second pre-call content can be generated based on other data. Thereafter, should the user receiving an incoming call initialized by the other user, the second pre-call content can be presented to the user in furtherance of refreshing the recollection of the user based on the second pre-call content over the first pre-call content.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
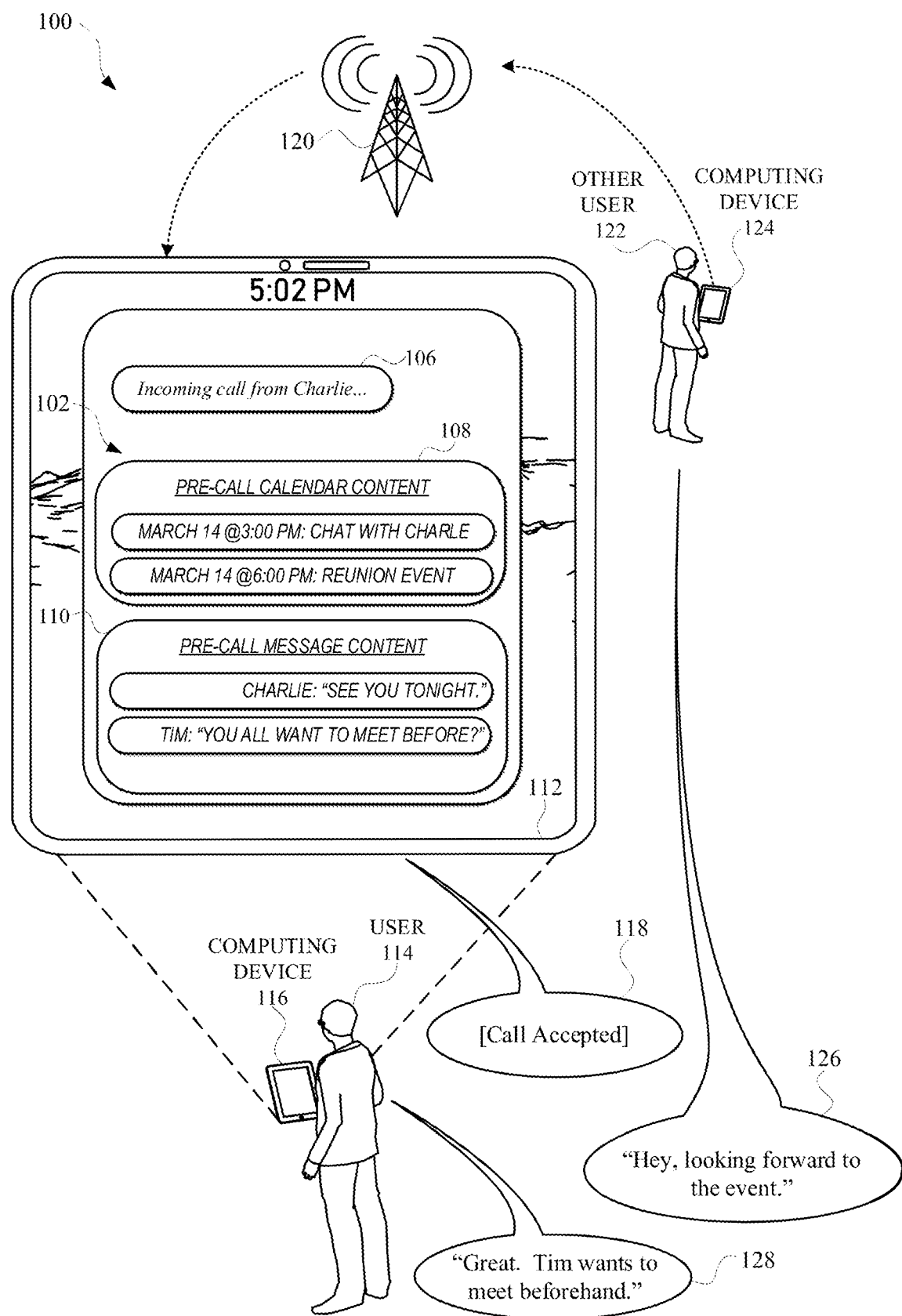
FIG. 1A and FIG. 1B each illustrate a view of a user being presented pre-call content when the user is receiving an incoming call from another user.

FIG. 1A illustrates a view 100 of a user 114 being presented pre-call content 102 when the user 114 is receiving an incoming call from another user 122. The other user 122 can initialize the call using a computing device 124, which can communicate with a computing device 116 over a network 120. When the other user 122 initializes the call with the user 114, the computing device 116 can provide pre-call content 102 and/or a notification 106 in anticipation of the user 114 indicating their acceptance of the call via the computing device 116. The pre-call content 102 includes first pre-call content 108 and second pre-call content 110, described in more detail below. The notification 106 can be presented at a display panel 112 of the computing device 116 in response to the other user 122 initializing the phone call to the user 114. Additionally, or alternatively, the pre-call content 102 can also be presented to the user 114 and/or the other user 122 via a display panel 112 in response to the other user 122 initializing a call to the user 114.

The pre-call content 102 can be generated based on data from one or more different sources. In some implementations, the pre-call content 102 can be generated using one or more trained machine learning models. For instance, an input can be applied to a trained machine learning model, and an output that is based on the input being applied to the trained machine learning model can be used as a basis for generating the pre-call content 102. The pre-call content 102 can be generated prior to the other user 122 initializing the call to the user 114, in order to eliminate latency that may otherwise be exhibited. For instance, prior to the other user 122 initializing the call to the user 114, the various types of data can be applied to one or more trained machine learning model, such as calendar data and/or message data. Output data, resulting from these types of data being applied to the one or more trained machine learning models, can be used as a basis for generating first pre-call content 108 and second pre-call content 110.

For example, in order to generate the first pre-call content 108, calendar data and other data identifying the other user 122 can be applied to a trained machine learning model. Output data that is provided as a result can be used as a basis for generating the first pre-call content 108, which can include calendar data that is associated with the other user 122. Furthermore, message data and data identifying the other user 122, can be applied to a trained machine learning model. Output data that is provided as a result can be used as a basis for generating the second pre-call content 110, which can include message data that is also associated with the other user 122. Subsequent to generating such pre-call content, should the other user 122 initialize a call to the user 114, the pre-call content 102 can be presented to the user 114 and/or the other user 122 via the computing device 116 and/or the other computing device 124, respectively.

As an example, and as provided in FIG. 1A, in response to the other user 122 initializing the call, the pre-call content 102 can be presented at the display panel 112. As a result, the user 114 is able to review the pre-call content 102 prior to indicating acceptance of the call. For instance, the display panel 112 can be a touch display panel 112 that allows the user 114 to provide one or more gestures in order to scroll through the pre-call content 102 in order to view more of the first pre-call content 108 and/or view more of the second pre-call content 110. In some implementations, the first pre-call content 108 can be initially displayed and the second pre-call content 110 can be partially displayed, or omitted, until the user 114 provides one or more gestures indicating the user 114 would be interested in viewing the second pre-call content 110. For instance, the user 114 can be providing a tap gesture, slide gesture, single touch gesture, multi-touch gesture, spoken gesture, facial gesture, and/or any other gesture that can be provided as input to a computing device.

When the user 114 indicates acceptance 118 of the incoming call from the other user 122, one or more communication channels can be established between the computing device 116 and the other computing device 124 via the network 120. The call can be a voice call, video call, both video and voice call, and/or any other type of call that can be executed via computing devices. As an example, and as provided in FIG. 1A, the call can be a voice call in which the other user 122 and the user 114 can provide verbal inputs. For instance, the other user 122 can provide a first input 126 such as, "Hey, looking forward to the event," and the user 114 can provide a second input 128 such as, "Great. Tim wants to meet beforehand." The first input 126 and/or the second input 128 can be dialog content of the call between the user 114 and the other user 122.

Figure 1B:
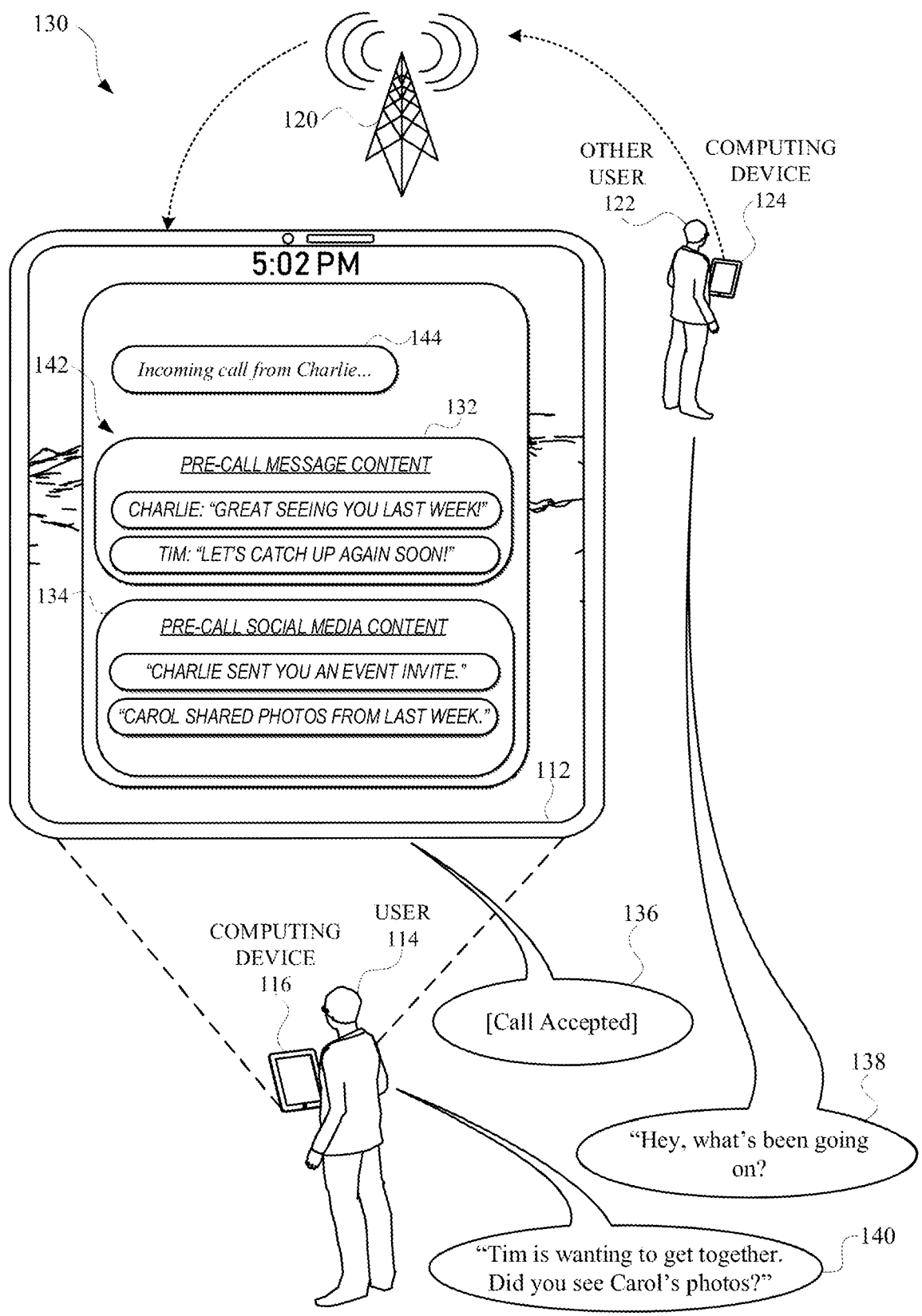

The dialog content, with prior permission from the user 114 and the other user 122, can be captured as data that can be used as a basis for generating subsequent pre-call content 142, as provided in view 130 of FIG. 1B. For instance, the dialog content can be compared to the pre-call content 102 to determine whether one or more correlations between the dialog content and the pre-call content 102 were apparent. A correlation that can be identified may include the second pre-call content 110 identifying a message from "Tim" and the user 114 providing the second input 128 that identifies "Tim." Additionally, or alternatively, a correlation that can be identified can include the other user 122 providing the first input 126 that identifies "the event," and the first pre-call content 108 that identifies the "reunion event." In some implementations, one or more correlations can be identified by comparing data that is based on the dialog content, to data that is based on first pre-call content 108, and also to other data that is based on the second pre-call content 110. In some implementations, one or more correlations can be identified by applying, to one or more trained machine learning models, data characterizing the dialog content and other data characterizing the first pre-call content 108. Also, one or more correlations can be identified by applying, to one or more trained machine learning models, data characterizing the dialog content and other data characterizing the second pre-call content 110.

Other pre-call content 142 can be provided to the user 114 and/or the other user 122 via their respective computing devices in response to the user 114 and/or the other user 122 initializing a call. For example, as provided in FIG. 1B, when the computing device 116 is awaiting acceptance of the incoming call from the other user 122, the display panel 112 can be caused to provide another notification 144 and other pre-call content 142. The notification 144 can be an optional notification that the user 114 is receiving a request to participate in a call with the other user 122 (e.g., "Charlie"). The other pre-call content 142 can be provided at the display panel 112 and can include first pre-call content 132 and second pre-call content 134.

The first pre-call content 132 and the second pre-call content 134 can be provided at the display panel 112 based on whether one or more correlations were identified between the dialog content and the first pre-call content 108, and the dialog content and the second pre-call content 110. Furthermore, the arrangement of the first pre-call content 132 and the second pre-call content 134 at the display panel 112 can be based on whether the one or more correlations were identified. For example, the "message" type of pre-call content can be assigned a higher priority than the "calendar" type of pre-call content when a correlation between the dialog content and the second pre-call content 110 is identified, but no correlation between the dialog content and the first pre-call content 108 is identified. Additionally, or alternatively, "calendar" type pre-call content can be assigned a lower priority relative to one or more other types of pre-call content when no correlation between the "calendar" type pre-call content and the dialog content is identified. As a result, a priority of "calendar" type pre-call content can have a lower priority relative to "social media" type pre-call content, as illustrated in FIG. 1B. As a result, the display panel 112 can present "message" type pre-call content and "social media" type pre-call content when the computing device 116 is awaiting acceptance 136 of the subsequent incoming call from the other user 122.

For example, when the computing device 116 provides the notification 144 of the incoming call, the user 114 can be presented with the first pre-call content 108, which can provide content corresponding to various activities of one or more messaging applications. For instance, content from two different messaging applications can be consolidated to provide the first pre-call content 132, which can include a portion of a latest message from "Charlie," the other user 122 who initialized the call, and "Tim," someone that the user 114 mentioned in the dialog content. The user 114 can influence subsequent presentations of pre-call content by engaging with the other pre-call content 142 (e.g., thereby causing one or more trained machine learning models to reflect the positive engagement by the user), and/or by not engaging with the other pre-call content 142 (e.g., thereby causing one or more trained machine learning models to reflect the negative engagement by the user). Additionally, or alternatively, positive engagement can be indicated by the user and/or the other user 122, providing one or more gestures before, during, and/or after the other pre-call content 142 is be presented to the user 114.

For example, after acceptance 136 of the subsequent call, the other user 122 can provide a first input 138 such as "Hey, what's been going on?" to which the user 114 can respond with a second input 140, "Tim is wanting to get together. Did you see Carol's photos?" Dialog content capturing the first input 138 and other dialog content capturing the second input 140 can be compared to the other pre-call content 142 to determine whether one or more correlations are apparent. Because the user 114 mentioned "Carol's photos" and a message from "Tim," each of the first pre-call content 132 and the second pre-call content 134 can have positive correlations to the dialog content. As a result, the content, type of content, and/or other data related to the other pre-call content 142 can be treated as encouraging positive engagement, thereby presumably assisting the user 114 before accepting a call. This can allow for more efficient calls between users, as users would no longer need to access separate applications to be reminded of certain information (e.g., recent calendar events and/or messages). This can also help to ensure that the information is available at a time of need, particularly where communication signals are intermittent. Additionally, because the information may be retrieved from one or more locations in secondary storage (for example, flash memory) and loaded into primary memory (e.g., volatile RAM) in advance of the user requesting that information, retrieval of that information occurs more quickly from perspective of the user. This can also result in a decrease in usage of computational resources that might otherwise be consumed while the user is on the phone, and attempting to remember the information, thereby prolonging the call longer than necessary. When pre-call content is provided before video calls, computational resources can be even more preserved, relative to audio calls, as many video calls require the exchange of high definition video over the period of the video call.

Figure 2A:
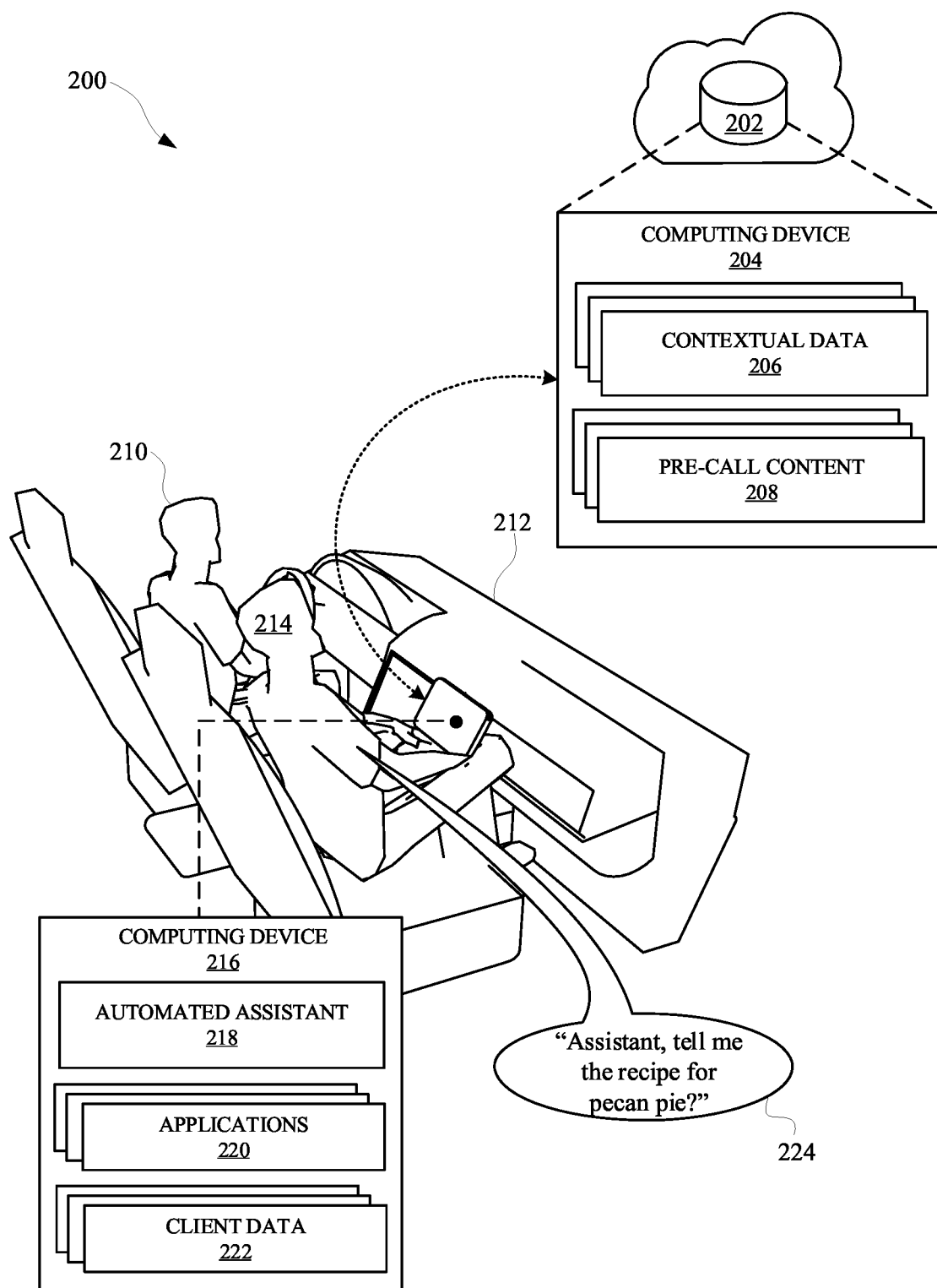
FIG. 2A, FIG. 2B, and FIG. 2C illustrate a user changing contexts and causing pre-call content to be generated based on the changes in context.
Figure 2B:
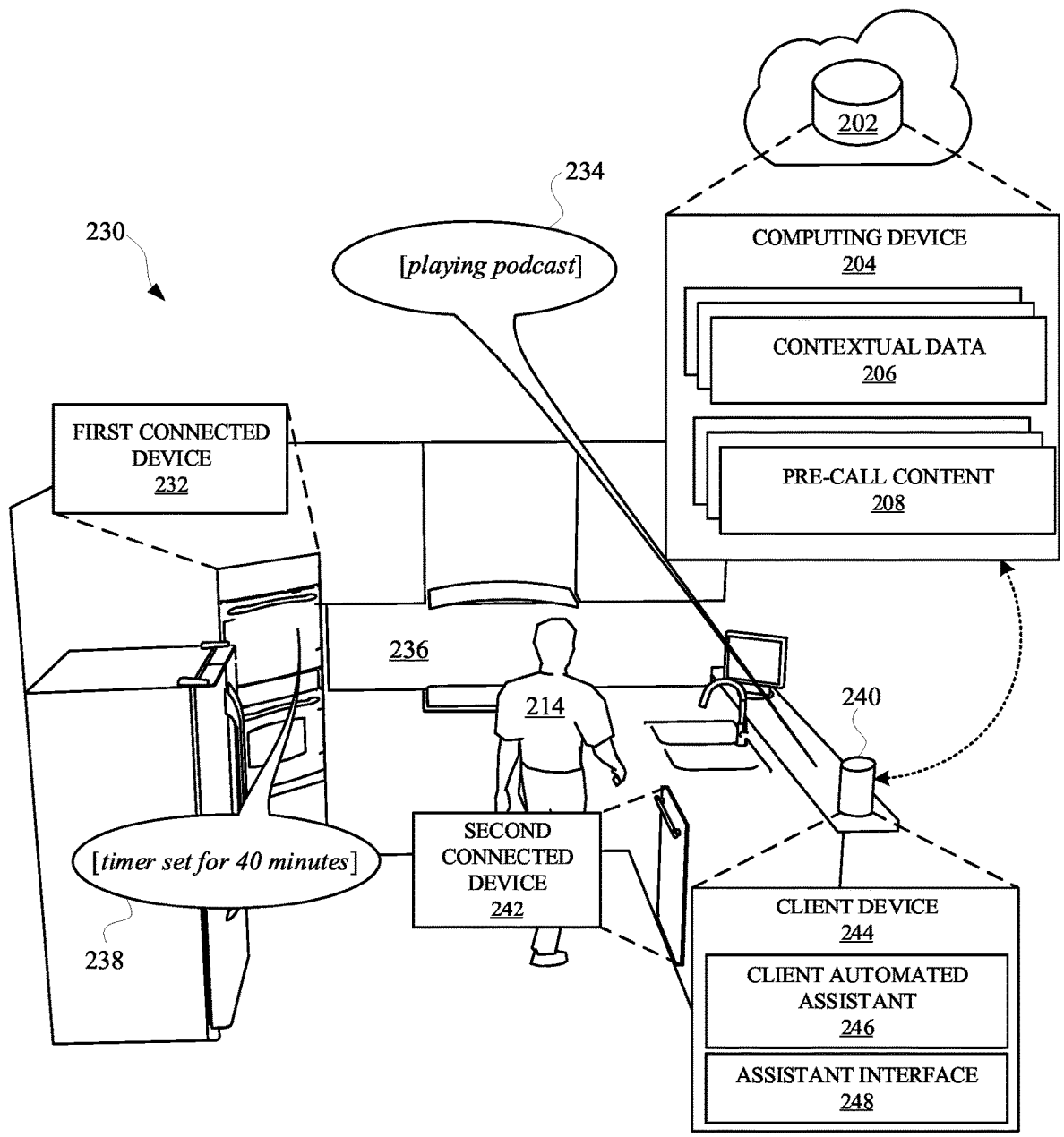
Figure 2C:
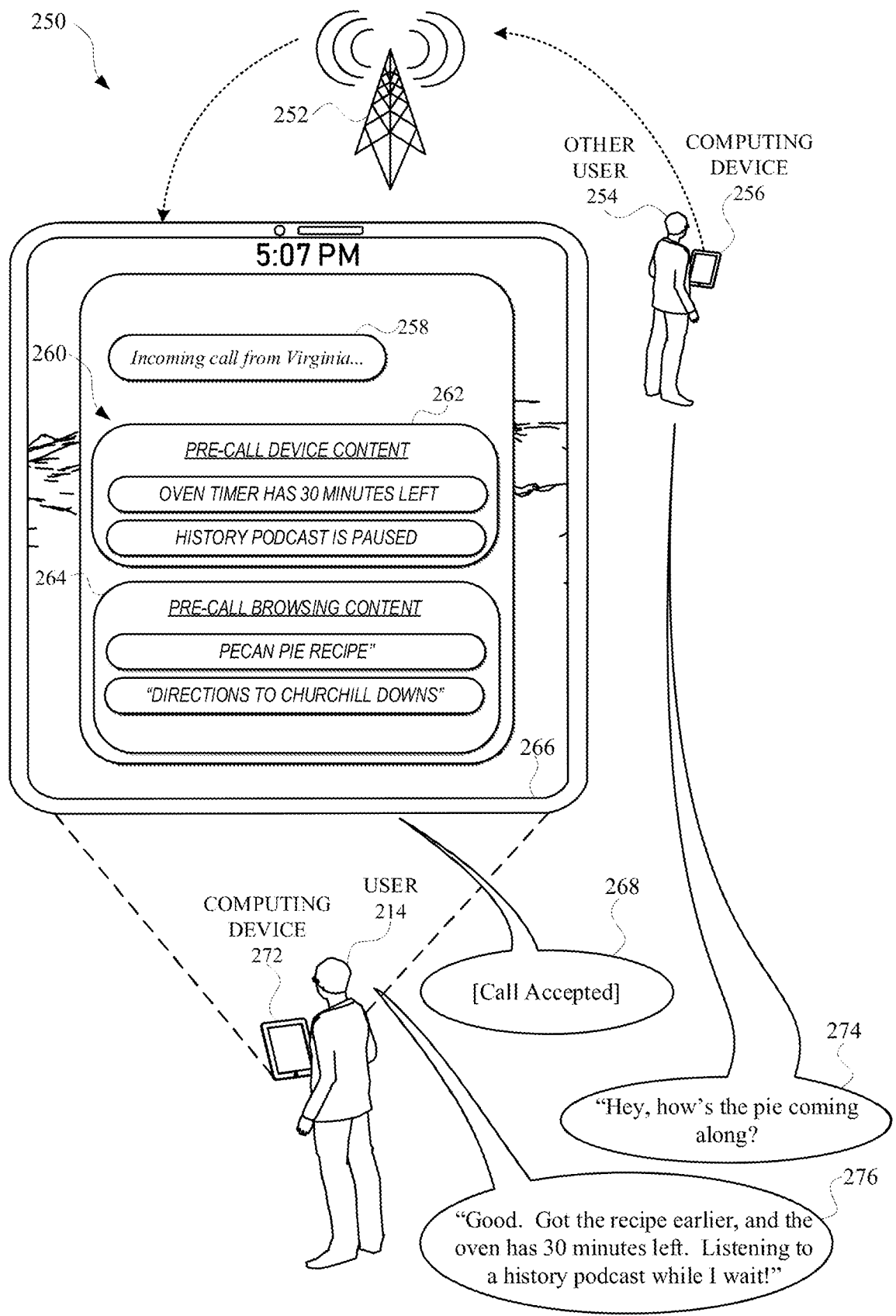

FIG. 2A, FIG. 2B, and FIG. 2C illustrate a user changing contexts and causing pre-call content to be generated according to the changes in context. For example, FIG. 2A illustrates a view 200 of a user 214 riding in a vehicle 212 with another user 210. While riding in the vehicle, the user 214 can be engaging in one or more activities with a computing device 216, which can include a location sensor from which a location of the computing device 216 can be determined. Additionally, the computing device 216 can include, or otherwise provide access to, an automated assistant 218. The user 214 can engage with the automated assistant 218 via one or more gestures and/or one or more spoken utterances. For example, while riding in the vehicle 212, the user 214 can provide a spoken utterance 224 such as, "Assistant, tell me the recipe for pecan pie." In response, the automated assistant 218 can access client data 222 and/or one or more applications 220 in order to fulfill the request from the user 214. In order to fulfill the request, the automated assistant 218 can access a browser application of the applications 220 and download recipe data, which can be stored as part of the client data 222.

The computing device 216 can be in communication with a remote computing device 202, such as computing device 204, which can be a server device. The computing device 204, with prior permission from the user 214, can generate and/or otherwise access contextual data 206, which can characterize activities of the user 214 over time. The contextual data 206 characterizing the activity of the other user 214 can be used to generate pre-call content 208. The pre-call content 208 can be generated at any time, regardless of whether there is an incoming call coming from another user or not. For example, in response to the user 214 invoking the automated assistant 218 to download the recipe, pre-call content 208 can be generated in order to characterize the interaction with the automated assistant 218, should the user 214 receive an incoming call that is associated with the interaction. For example, the user 214 may have a Derby event to attend on their calendar, and the Derby event may describe "pecan pie" as being served at the Derby event. Therefore, the pre-call content 208 can be provided to the user 214 in response to a Derby event invitee (e.g., "Virginia") calling the user 214. In other words, when the computing device 216 is waiting for the user 214 to accept the call, pre-call content 208 can be provided at a display panel at the computing device 216, in order to refresh a recollection of the user 214, especially with respect to the pecan pie recipe and/or the Derby event. However, should the user 214 perform other activities that are temporarily separate from the activities in the vehicle 212, those subsequent activities can be used as a basis for generating other pre-call content 208.

For example, FIG. 2B illustrates a view 230 of the user 214 engaging in activities within their kitchen 236, subsequent to the user 214 riding in the vehicle 212. The user 214 can be engaged in activities such as baking a pecan pie using a first connected device 232, washing dishes via a second connected device 242, and playing a podcast 234 via a client device 244, such as a standalone speaker device 240. The user 214 can engage in each activity using one or more computing devices, and/or an automated assistant to interact with various devices.

The subsequent activities engaged in by the user 214 can also be characterized by contextual data 206, and used as a basis from which to generate additional pre-call content 208. For example, pre-call content 208 generated based on the activities depicted in FIG. 2B can include "operational" type data. In this way, should the user 214 receive an incoming call from the Derby event invitee (e.g., "Virginia"), the client device 244 can audibly render pre-call content 208 in order to refresh the recollection of the user 214 in furtherance of the user having a more efficient call related to the Derby event. For example, the client device 244 can render audio characterizing an operational status of the first connected device 232, an operational status of the second connected device 242, and a current operating status of the client device 244, while also providing an audible sound indicating that an incoming phone call is awaiting acceptance by the user 214. As an example, the client device 244 can render a ringing sound to indicate an incoming call is being received, while also rendering audio data such as, "The oven timer has 35 minutes left," since the user 214 previously requested a recipe that was related to the Derby event, and a Derby event invitee is calling the user 213. However, if no call is received while the user is engaging in the activities, pre-call content 208 can be otherwise stored and available to be presented at another time in the future. It will be appreciated that the above operations may be executed in response to an incoming call being received at a different client device to the client device 244. For example, the client device 244 may perform the above described operations in response to an incoming call being received at a smartphone device. That is, pre-call content may be provided on a device other than the device at which the incoming call is received.

FIG. 2C depicts the user in a context, subsequent to those characterized in FIG. 2A and FIG. 2B. However, pre-call content generated based on the activities of the user 214 within each context can be stored and presented within the context depicted in FIG. 2C. For example, as provided in view 250 of FIG. 2C, first pre-call content can be generated based on data that resulted from the user 214 engaging in the activity depicted in FIG. 2B, in which the user 214 initialized their oven timer 238. The timer could have been initialized the user 214 via a request to a client automated assistant 246 via an assistant interface 248 of the client device 244. Therefore, when generating first pre-call content 262, automated assistant data and/or device data can be accessed in order to provide relevant pre-call content such as, "Oven timer has 30 minutes left." In some implementations, an incoming call can affect a current operating status of a device, such as the client device 244, which can pause an audio output (e.g., podcast audio) in response to an incoming call from another user 254. Therefore, any pre-call content that is generated based on operational data characterizing the client device 244 can be updated in response to the incoming call, and reflected at a display panel 266 of a computing device 272. For instance, as provided in view 250, pre-call content 260 provided to the user 214, while the computing device 272 is awaiting acceptance of the call, can include first pre-call content 262 including "History podcast is paused."

Furthermore, in response to the other user 254 (e.g., a Derby event invitee) initializing a call to the user 214 via computing device 256, second pre-call content 264 can be provided at the display panel 266 based on activities of the user 214 described with respect to the FIG. 2A. In some implementations, a synopsis of activities and/or content viewed by the user 214 can be presented as part of the pre-call content. For instance, because the user 214 was viewing a "recipe" via a web browser application of the computing device 216, content of the recipe web page can be applied to a machine learning model for generating data from which a synopsis of the web page can be generated. Therefore, as a result, the pre-call content 260 can include second pre-call content 264 such as "Pre-Call Browsing Content" that provides a synopsis of a recent web page (e.g., "pecan pie Recipe") viewed by the user 214. Furthermore, other browsing content can also be characterized by the second pre-call content 264, such as "Directions to Churchill Downs," if the user 214 had recently requested that the automated assistant provide such directions.

Each of the first pre-call content 262 and the second pre-call content 264 can correspond to different sources and/or types of pre-call content. In this way, an amount of engagement with each type and/or source of content can be determined, in order that one or more trained machine learning models can be trained based on such engagement. Furthermore, the user 214 can engage with the pre-call content 260 in order to determine whether to accept the call from the other user 254 or not accept the call. Should the user 214 elect to indicate acceptance 268 of the call, the pre-call content 260 can enable the user 214 to have a more effective call, compared to if the user had not seen the pre-call content 260. For example, the other user 254 can be the Derby event invitee, and can provide a first input 274 to the call, such as "Hey, how's the pie coming along?" and in response, the user 214 can provide a second input 276 such as, "Good. Got the recipe earlier, and oven has 30 minutes left. Listening to a history podcast while I wait!" By providing the pre-call content 260, based on the association of the caller to the user's 214 calendar event, the user 214 is able to be more readily responsive during the call, thereby reducing the amount of the time the user 214 will be on the call, as well as the other user 254 being on their respective computing device 256.

Figure 3:
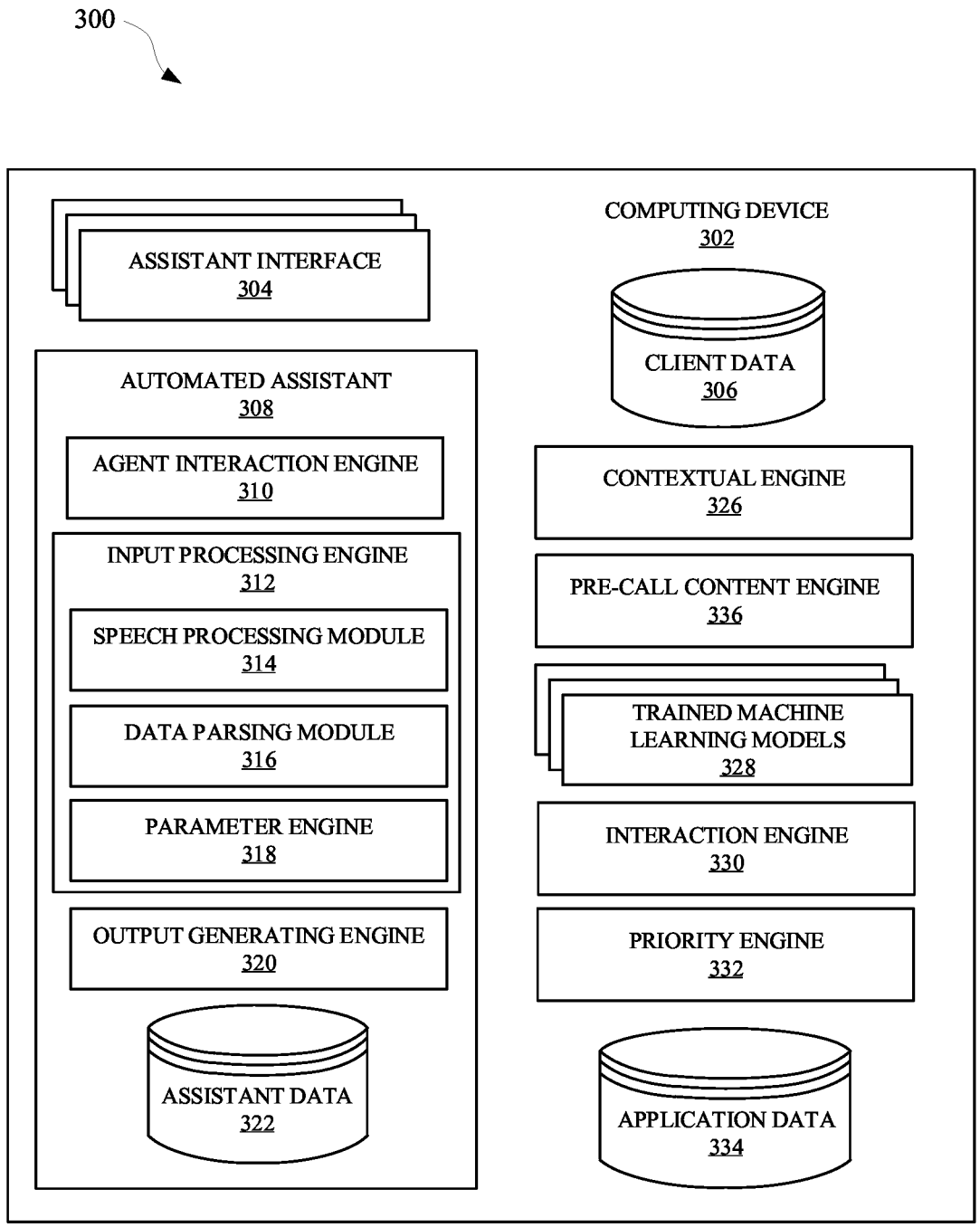
FIG. 3 illustrates a system for providing pre-call content to one or more users that are expected to receive an incoming call.

FIG. 3 illustrates a system 300 for providing pre-call content to one or more users that are expected to receive an incoming call. The pre-call content can be provided in order to eliminate the need for other application data to be accessed during a call in order to eliminate waste of energy and/or computational resources during a call. In some implementations, the pre-call content can be provided via an automated assistant 308 that is accessible to a client device, and/or via any other application or module that is access to the client device. The automated assistant 308 can operate as part of an automated assistant application that is provided at one or more computing devices 302. A user can interact with the automated assistant 308 via one or more assistant interfaces 304, which can include one or more of a microphone, a camera, a touch screen display, a user interface, and/or any other apparatus capable of providing an interface between a user and an application. For instance, a user can initialize the automated assistant 308 by providing a verbal, textual, and/or a graphical input to the assistant interface to cause the automated assistant 308 to perform a function (e.g., provide data, control a device (e.g., control an IoT device, access an agent, modify a setting, control an application(s), etc.). The computing device 302 can include a display device, which can be a display panel that includes a touch interface for receiving touch inputs and/or gestures for allowing a user to control applications of the computing device 302 via the touch interface. The touch inputs and/or other gestures (e.g., spoken utterances) can also allow a user to interact with the automated assistant 308.

In some implementations, the computing device 302 can lack a display device but include an audio interface (e.g., a speaker and/or a microphone), thereby providing an audible user interface output, without providing a graphical user interface output, as well as providing a user interface, such as a microphone, for receiving spoken natural language inputs from a user. For instance, in some implementations, the computing device can include one or more tactile input interfaces, such as one or more buttons, and omit a display panel that would be provided graphical data from a graphics processing unit (GPU). In this way, energy and processing resources can be saved compared to a computing device that includes a display panel and GPU.

The computing device 302 can be in communication with a server device over a network, such as the internet. The computing device 302 can offload computational tasks to the server device in order to preserve computational resources at the computing device 302. For instance, the server device can host an automated assistant, and the computing device 302 can transmit inputs received at one or more assistant interfaces, and/or a user interface, to the server device. However, in some implementations, the automated assistant 308 can be hosted at the computing device 302. In various implementations, all or less than all aspects of the automated assistant 308 can be implemented on the server device and/or the computing device 302. In some of those implementations, aspects of the automated assistant 308 are implemented via a local automated assistant and interface with the server device, which can implement other aspects of the automated assistant 308. The server device can optionally serve a plurality of users and their associated assistant applications via multiple threads. In implementations where all or less than all aspects of the automated assistant 308 are implemented via a local automated assistant of the computing device 302, the local automated assistant can be an application that is separate from an operating system of the computing device 302 (e.g., installed "on top" of the operating system)—or can alternatively be implemented directly by the operating system of the computing device 302 (e.g., considered an application of, but integral with, the operating system).

In some implementations, the automated assistant 308 can include an input processing engine 312, which can employ multiple different engines for processing inputs and/or outputs for computing device 302. For instance, the input processing engine 312 can include a speech processing engine 314 that can process audio data received at an assistant interface 336 to identify the text embodied in the audio data. The audio data can be transmitted from, for example, the computing device 302 to the server device in order to preserve computational resources at the computing device 302.

The process for converting the audio data to text can include a speech recognition algorithm, which can employ neural networks and/or statistical models for identifying groups of audio data corresponding to words or phrases. The text converted from the audio data can be parsed by a data parsing engine 316 and made available to the automated assistant 308 as textual data that can be used to generate and/or identify command phrases from the user. In some implementations, output data provided by the data parsing engine 316 can be provided to an action engine 318 to determine whether the user has provided an input that corresponds to a particular action and/or routine capable of being performed by the automated assistant 308 and/or an application, agent, and/or device that is capable of being accessed by the automated assistant 308. For example, assistant data 322 can be stored at the server device and/or the computing device 302, and can include data that defines one or more actions capable of being performed by the automated assistant 308, as well as parameters involved in performing those actions.

When the input processing engine 312 has determined that a user has requested a particular action or routine be performed, the action engine 318 can determine one or more parameter values for the particular action or routine, and an output generating engine 320 can then provide an output to the user based on the particular action, routine, and/or the one or more parameters. For instance, in some implementations, in response to a user input, such as a gesture directed at the assistant interface 336, the automated assistant 338 can cause data, which characterizes the gesture, to be transmitted to the server device for determining the action that the user is intending the automated assistant 308 to perform.

The system 300 can further include a pre-call content engine 336 that generates pre-call content for one or more users in anticipation of the one or more users receiving a call from one or more other users. The pre-call content engine 336 can access client data 306, assistant data 322, and/or application data 332 at the computing device 302 and/or any other device for generating the pre-call content. For instance, the computing device 302 can include various applications with which a user can engage in a variety of different activities, such as, but not limited to, sending a message to another user and sharing media (e.g., photos and/or videos) with another user. When a user performs a particular activity, data associated with that activity can be processed, with permission from the user, by a contextual engine 326. The contextual engine 326 can process the data in order to identify correlations between the data and one or more other users, which the user can receive an incoming call from. When the data, which is generated based on a context or particular activity, is identified as being associated with another user, the contextual engine 326 can interact with the pre-call content engine 336 in order to cause the pre-call content engine 336 to generate pre-call content based on the identified data. For example, if the activity includes the user sending a message and a video to another user, the message and video can be used as a basis from which to generate pre-call content.

In some implementations, multiple different instances of pre-call content can be generated, and each instance of pre-call content can be assigned a priority by a priority engine 332. The assigned priority for a particular instance of pre-call content can indicate a predicted propriety of the pre-call content to a call that may occur between a user and another user. In other words, the assigned priority for the particular instance can indicate a prediction of how appropriate the pre-call content is to the call. For instance, when an instance of pre-call content is generated by the priority engine 332, based on a most recent message between a user and another user, the instance of pre-call content can be assigned a highest priority relative to other instances of pre-call content that correspond to the user and the other user. Such assignment of the highest priority can be based at least in part on the most recent message being the most recent in time message between the user and the other user. In this way, should the other user call the user, the highest priority pre-call content can be presented to the user while the call is pending acceptance by the user. Should the user subsequently engage in another activity associated with the other user, and that other activity be different than sending a message (e.g., creating a calendar event that identifies the user and the other user), additional pre-call content can be generated by the pre-call content engine 336 based on the other activity.

The additional pre-call content can be assigned a priority by the priority engine 332 based on historical determinations of the propriety of the other activity to calls between the user and the other user. For instance, dialog content data and pre-call content data can be applied to one or more trained machine learning model 328 (e.g., trained based on the historical determinations) in order to determine a measure that indicates predicted propriety of the pre-call content to the dialog content. The measure can be used as a basis for adjusting an assigned priority of any other instances of pre-call content that correspond to the same activity as an activity corresponding to the pre-call content data. Furthermore, multiple instances of pre-call content data can be stored on the computing device 302, and one or more instances of the pre-call content data can correspond to different other users that may call the user, or have called the user in the past. For instance, pre-call content data can be generated in response to a particular user calling the user for the first time, and in expectation that the particular user will call the user again.

In some implementations, the contextual engine 326 can determine a current context of a user and cause the computing device 302 to render pre-call content according to the current context. For instance, when the client data 306 indicates that the user is controlling the computing device 302 or another computing device from a headset, the contextual engine 326 can communicate with the pre-call content engine 336 in order to convert any suitable pre-call content to audio format. In this way, should the user receive an incoming call, the pre-call content can be rendered audibly while the computing device 302 is awaiting acceptance of the call by the user. In some implementations, the client data 306 can indicate that the user is driving a vehicle, and therefore may be difficult to look at a screen. Therefore, based on this indication, the contextual engine 326 can communicate with the pre-call content engine 336 in order to convert any suitable pre-call content to audio format, should the user receive a call while operating the vehicle.

In some implementations, an interaction engine 330 of the system 300 can generate data that characterizes an extent to which a user has interacted with pre-call content, and that data can be shared with the priority engine 332. The priority engine 332 can then re-assign priorities of particular instances of pre-call content according to whether the user engaged with certain pre-call content or not. For instance, a user that receives a call from their best friend or spouse may never rely on pre-call content, and therefore never be perceived to interact with the pre-call content. As a result, the interaction engine 330 can share certain data with the priority engine 332 indicating that pre-call content for the best friend and/or the spouse can have a low priority or otherwise be removed. In some implementations, when pre-call content generated for particular anticipated callers is assigned a lower priority relative to other anticipated callers, and/or for a threshold period of time, pre-call content for those particular anticipated callers can be bypassed. In this way, the user will not be shown pre-call content for those anticipated callers from which the user has a history of not relying on such pre-call content.

In some implementations, the contextual engine 326 can determine a context of the user in order to promote privacy of the user when providing pre-call content. For instance, the contextual engine 326 can determine, with prior permission from the user, that the user is away from their home and/or in a public location. Furthermore, the interaction engine 330 can determine, based on information from the contextual engine 326, whether the user typically engages with pre-call content when away from their home and/or in public places. When the user has a history of not engaging with pre-call content while away from their home and/or in public places, regardless of the caller, the interaction engine 330 and/or contextual engine 326 can communicate this preference of the user to the priority engine 332. In response, the priority engine 332 can re-assign priorities of certain pre-call content when the user is determined to be away from their home and/or in a public place. Additionally, or alternatively, the priority engine 332 can assign a tag to certain pre-call content indicating that the pre-call content should not be shown until the tag is withdrawn, or should not be shown while the user is away from their home and/or in a public place.

In some implementations, various gestures performed by the user when pre-call content is being presented can be identified by the interaction engine 330. The gestures can be captured at one or more assistant interfaces 304, and can include voice input, motion gestures, touch gestures, two-dimensional gestures, three-dimensional gestures, and/or any other gestures that can be identified by a computing device. Furthermore, the interaction engine 330 can use gesture data provided by the assistant interface 304 to distinguish an amount of engagement a user has for certain pre-call content over other pre-call content. For instance, a gesture can cause a display interface of the computing device 302 to scroll away from first pre-call content in order to make second pre-call content appear for a longer period of time.

Figure 4:
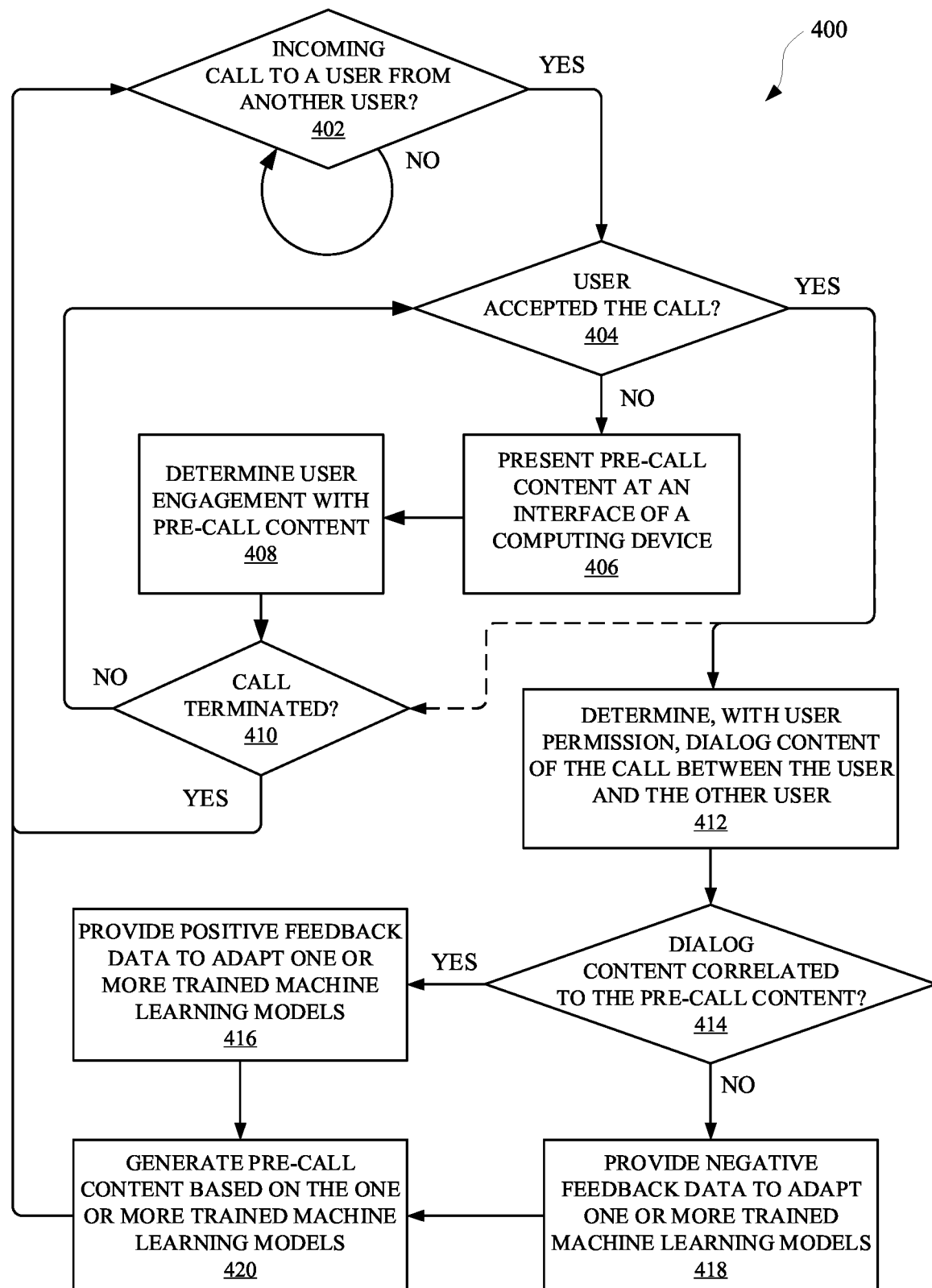
FIG. 4 illustrates a method for providing pre-call content to a user according to one or more different approaches.

FIG. 4 illustrates a method 400 for providing pre-call content to a user according to one or more different approaches. The method 400 can be performed by one or more computing devices, applications, and/or any other apparatus and/or module capable of generating content for a user. The method 400 can include an operation 402 of determining whether an incoming call is being received by a user from another user. For example, the user can have a portable computing device, such as a cell phone, capable of communicating via a wireless communication protocol with a separate portable computing device associated with the other user. When the other user initializes a phone call to the user, one or more network connections can be established for providing a communication channel between the portable computing device and the other portable computing device. Data generated in response to the other user initializing the phone call can be used as a basis for much to determine whether an incoming call to the user is being received from the other user. When, at operation 402, a determination is made that the user is receiving a call from another user, the method 400 can proceed to an operation 404.

The operation 404 can include a determination of whether the user has accepted the call from the other user. In some implementations, the user can indicate acceptance of the call from the other user by providing a user input to the portable computing device, and/or any other computing device that is associated with the portable computing device. For example, the user can indicate acceptance of the call by tapping a graphical element presented at a touch display panel have the portable computing device. Alternatively, the user can indicate acceptance of the call by providing a user input to a computing device that is separate from the portable computing device, such as a stand-alone speaker device, which can receive spoken utterances for indicating a willingness to accept phone calls.

When the user has not accepted the phone call, the method 400 can proceed to operation 406 of presenting pre-call content at an interface of the computing device (e.g., the portable computing device). The pre-call content can be generated based on data that is associated with the user that is receiving the call and/or the other user that has initialized the call. Alternatively, or additionally, when the user is the one who initialized the call, the pre-content can be presented at the interface of the computing device while the user is waiting for the other user to indicate acceptance of the initialized call. The pre-call content can be generated for indicating various different subject matter. For instance, the pre-call content can be generated for indicating one or more predicted subjects that will be discussed during the phone call. Alternatively, or additionally, the pre-call content can be generated for attempting to refresh a recollection of the user and/or the other user prior to the users participating in the phone call. Alternatively, or additionally, the pre-call content can be generated in order to provide guidance to the user regarding whether to even accept the call or not, for instance, based on security concerns, past user experiences with calls from the other user, a current context of the user and/or the other user, and/or any other information from which a user can determine whether to accept an incoming call.

The method 400 can proceed from the operation 406 to the operation 408, which can include determining user engagement with the pre-call content. In some implementations, the amount of engagement with pre-call content can be based on one or more user inputs provided to one or more computing devices that provided and/or are otherwise associated with the pre-call content. In some implementations, the amount of engagement with pre-call content can be determined based on other user activities that can be associated with the pre-call content. In some implementations, user engagement with pre-call content can be determined based on an amount of time that the user caused first pre-call content to be presented at an interface of the computing device, and a separate amount of time that the user caused second pre-call content to be presented at the interface of the computing device. In the aforementioned example, when the amount of time that the first pre-call content was presented is greater than the separate amount of time that the second pre-call content to be presented, the first pre-call content can be designated as more relevant to calls between the user and the other user than the second pre-call content. In some implementations, relevance of pre-call content to certain calls can be provided as positive feedback and/or negative feedback to a trained machine learning model that can be used as a basis for creating output from which call content can be based.

The method 400 can proceed from the operation 408 to the operation 410, which can include determining whether the call has been terminated. For example, if the user is determined to have not accepted the call at operation 404, and subsequently the user or the other user have terminated the call, the method 400 can proceed from the operation 410 back to the operation 402. In other words, the user would not have accepted the call, and therefore the method 400 can return to determining whether there is an incoming call. In some implementations, if the user is determined to have engaged with the pre-call content prior to terminating the call, the pre-call content, and/or a source of the pre-call content can be determined as relevant for the user When making decisions about whether to accept or terminate incoming calls from the other user. However, if the user is determined to have not engaged with the pre-call content prior to terminating the call, the pre-call content, and/or the source of the pre-call content, can be determined to be irrelevant to the user when the user is making decisions about whether to accept or terminate incoming calls from the other user. In some implementations, each pre-call content, type of pre-call content, and/or source of pre-call content can be assigned a priority, which can be dynamically modified according to whether the user engages with such pre-call content. Therefore, determinations of engagement can influence whether the user will be presented with certain pre-call content, types of pre-call content, and/or content from certain sources of pre-call content. For example, if a user engages with pre-call content that is based on a source such as a calendar application, that source can be assigned a higher priority than another source, such as a GPS source of location data.

When the user has not terminated the call at operation 410, the method 400 can continue at operation 404 where the determination is made as to whether the user has accepted the incoming call. When the user is determined to have accepted the call at operation 404, the method 400 can optionally proceed to the operation 410. This optional path can result in the user accepting the call, and subsequently awaiting the call to be discontinued. For example, if the call has been undertaken for a few minutes, the call can then be terminated at the operation 410, and the method 400 can proceed to the operation 402. When the method 400 proceeds in this way, certain pre-call content, types of pre-call content, and/or sources of pre-call content can be reprioritized according to user engagement with the pre-call content prior to accepting the call. In this way, the next time the user receives an incoming call from the other user, the relevancy of the pre-call content would be optimized compared to the previous pre-call content presented to the user.

In some implementations, the method 400 can proceed from the operation 404 to the operation 412, after the user is determined to have accepted the call at the operation 404. The operation 412 can include determining, with user permission, dialog content of the first call between the user and the other user. For example, audio data corresponding to spoken inputs by the user can be captured and stored as dialog content of the call between the user and the other user. Alternatively, or additionally, audio data corresponding to spoken inputs from both the user and the other user can be captured and stored as dialog content of the call between the user and the other user. In some implementations, the audio data can be transcribed and further processed as contextual data corresponding to call between the user and the other user.

The method 400 can proceed from the operation 412 to the operation 414, which can include determining whether any of the dialogue content is related to the pre-call content presented to the user and/or the other user. For example, the audio data capturing the dialogue content can be compared to the pre-call content to determine whether one or more correlations are apparent. In some implementations, textual data transcribed from the audio data, with permission from the user, can be compared to the pre-call content in order to determine whether one or more correlations are apparent. As an example, the pre-call content can include a synopsis of a calendar event stored by a calendar application, and the calendar event can identify the user and the other user. When the dialogue content includes at least some amount of data characterizing at least some portion of the synopsis, the dialog content can be considered correlated to the pre-call content.

If one or more correlations are identified between the dialogue contact and the pre-call content, the method 400 can proceed to an operation 406 of providing positive feedback to one or more trained machine learning models. In this way, one or more machine learning models can be adapted to provide more relevant content prior to calls between the user and the other user. Furthermore, the method 400 proceed from the operation 416 to the operation 420. The operation 422 include generating pre-call content based on one or more trained machine learning models. Pre-call content can be generated before or after first call has been terminated, but before a second call has been initialized. In this way, latency between a call being initialized and the pre-call content being presented can be eliminated.

In some implementations, the method 400 can proceed from the operation 414 to the operation 418, when one or more correlations between the dialogue content and the pre-call content are not identified. For example, if the pre-call content included text from one or more correspondence between the user and the other user, and the dialog content does not mention any of the text, or anything synonymous with the text, no correlation would be identified. As a result, the method 400 can proceed to the operation 418 of providing negative feedback to one or more trained machine learning models. By providing negative feedback data to the one or more trained machine learning models, the one or more trained machine learning models can be adapted to provide more relevant data from which pre-call content can be generated. For instance, if a source from which pre-call content was generated results in no correlation being identified, the one or more trained machine learning models can be adapted to rely on that source data less often. In some implementations, the one or more trained machine learning models can receive as input, identifiers for participants on an incoming call, and available sources for pre-call content. Thereafter, the source that provides content that was most relevant can be assigned a higher priority than another source of content that was not relevant. In some implementation, priorities can correspond to one or more values for adjusting and/or otherwise training one or more trained machine learning models. For example, a node of a machine learning model associated with a particular type of pre-call content data source can have an adjustable priority value, which can influence a final arrangement of pre-call content that is generated for particular calls.

The method 400 can proceed from the operation 418 to the operation 420, in which pre-call content is generated based on the one or more machine learning models. In some implementations, one or more activities that a user engages in prior to the next incoming call and/or outgoing call can be used as a basis from which to further train the one or more machine learning models. Alternatively, or additionally, one or more activities that the user engages in prior to the next incoming call and/or outgoing call can be used as a basis from which to generate pre-call content to be presented when the user is being notified of the next incoming call.

Figure 5:
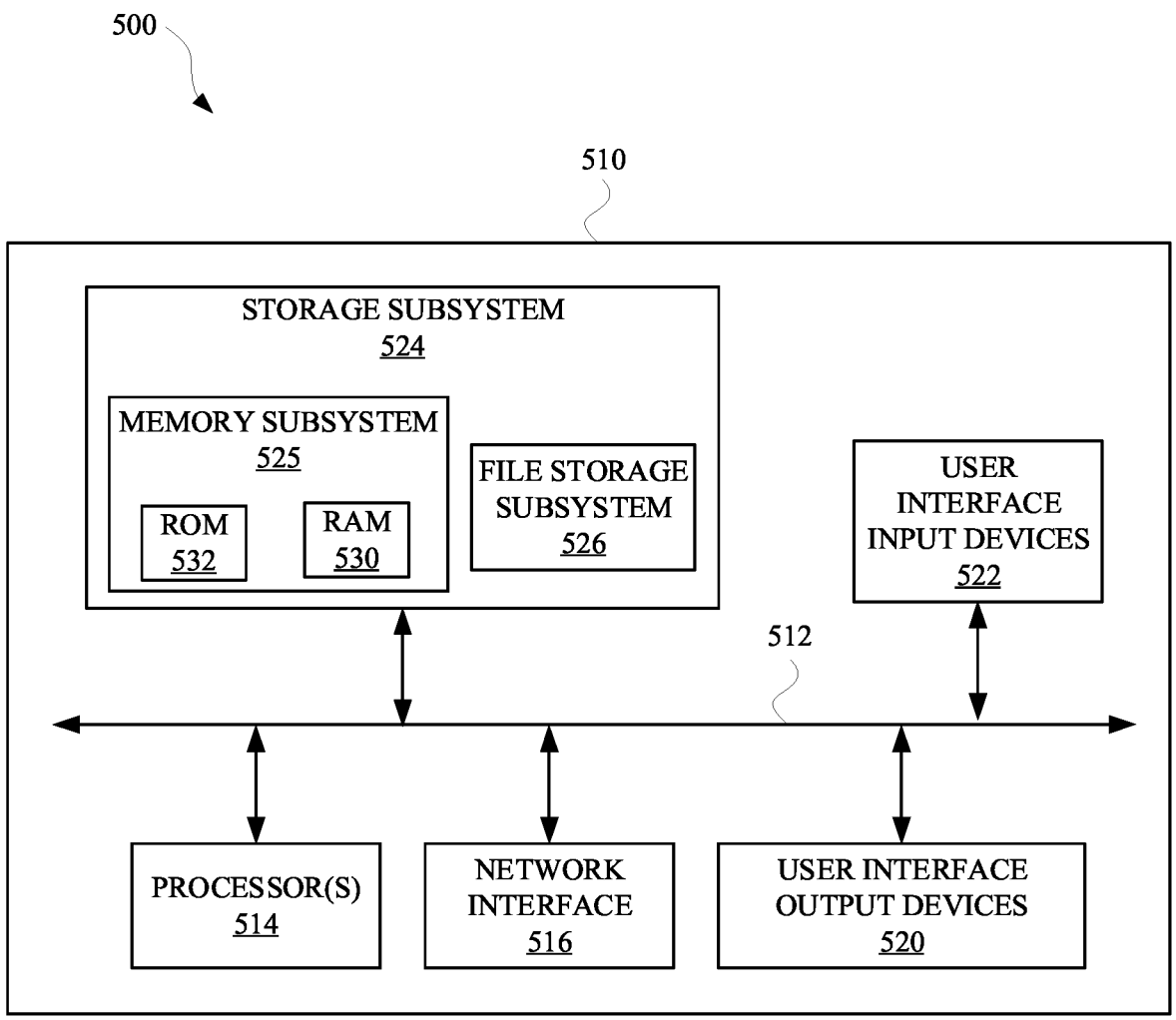
FIG. 5 is a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more of computing device 116, computing device 124, computing device 216, computing device 204, remote computing device 202, client device 244, computing device 272, computing device 256, computing device 302, and/or any other device, operation, application, and/or engine discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided and includes determining that a first call between a user and another user has been initialized via a wireless communication protocol between a computing device and another computing device. The method further includes, when the computing device is waiting for the user and/or the other user to indicate acceptance of the first call, causing pre-call content to be presented at an interface of the computing device. The pre-call content is optionally determined based on data that is generated using one or more trained machine learning models. The method further includes determining, subsequent to determining that the first call was initialized between the user and the other user, dialog content of the first call. The dialog content is based on one or more natural language inputs provided by the user and/or the other user during the first call. The method further includes determining, based on the dialog content, whether the pre-call content included at least one correlation to the dialog content. The method further includes determining, subsequent to determining whether the pre-call content included at least one correlation to the dialog content, that a second call between the user and the other user has been initialized. The method further includes, when the computing device and/or the other computing device is waiting for the user and/or the other user to indicate acceptance of the second call: causing the interface of the computing device, and/or another interface of another computing device, to present or omit the pre-call content based on whether the pre-call content included the at least one correlation to the dialog content.

These and other implementations of the technology disclosed herein can include one or more of the following features.

In some implementations, the method further includes, when the pre-call content is determined to include at least the one correlation to the dialog content: causing the one or more trained machine learning models to be further trained according to feedback data indicating a positive correlation between dialog content and the pre-call content; and when the pre-call content is determined to not include at least one correlation to the dialog content: causing the one or more trained machine learning models to be further trained according to other feedback data indicating a negative correlation between dialog content and the pre-call content.

In some implementations, the one or more trained machine learning models are stored on the computing device.

In some implementations, the method further includes, when the computing device and/or the other computing device is waiting for the user and/or the other user to indicate acceptance of the second call, and the pre-call content is presented at the interface of the computing device, and/or the other interface of the other computing device: causing the pre-call content at the interface of the computing device, and/or the other interface of the other computing device, to be arranged based on whether the pre-call content included the at least one correlation to the dialog content.

In some implementations, the pre-call content is generated in advance of the first call being initialized. In some versions of those implementations, the pre-call content is generated locally at the client device. In some additional or alternative versions of those implementations, the pre-call content is most recently generated pre-call content, generated in a most recent iteration of generating pre-call content relevant to the user and the other user. In some of those additional or alternative versions, the most recent iteration is performed at a time that is based on a measure of frequency and/or quantity of communications between the user and the other user and/or that is based on new content relevant to the user and/or the other user being received. By generating the content in advance of the first call being initialized, latency in presenting the first content is reduced, as is latency in accepting the first call. Moreover, when new pre-call content is iteratively generated for a given user based on frequency of communication with the given user and/or based on new content from and/or related to the user being received, new pre-call content is generated dynamically in a manner that is tailored to enable pre-call content to be fresh, but to conserve resources so that new pre-call content is not continuously generated for all users. For example, new pre-call content can be generated at a first higher frequency for a given user that a user typically communicates with daily, whereas pre-call content can be generated at a second lower frequency for an additional given user that the user typically communicates with only once a week.

In some implementations, a method implemented by one or more processors is provided and includes determining content for provisioning at an interface of a computing device when a user is receiving an incoming call from another user. The content includes first content data, which corresponds to a first assigned priority, and second content data, which corresponds to a second assigned priority. The first assigned priority and the second assigned priority indicate propriety of the content data, at least relative to the incoming call. The method further includes determining, subsequent to determining the content for provisioning at the interface of the computing device and in response to a wireless transmission initialized by the other user via another computing device, that the other user has initialized a call to the user via a wireless communication protocol. The method further includes, when the computing device is waiting for the user to indicate acceptance of the call: causing, in response to determining that the other user has initialized the call, the interface of the computing device to present the first content data and the second content data, where the first content data is prioritized over the second content data at least based on the first assigned priority and the second assigned priority. The method further includes determining, based on the provisioning of the first content data, engagement data that characterizes an amount of engagement exhibited by the user when the interface of the computing device provided the first content data, and another amount of engagement exhibited by the user when the interface of the computing device provided the second content data. The method further includes determining, based on the engagement data, a third assigned priority for the first content data and a fourth assigned priority for the second content data. The third assigned priority and the fourth assigned priority indicate a different propriety of the content data, at least relative to a subsequent incoming call from the other user. The method further includes determining, subsequent to determining the third assigned priority and the fourth assigned priority, that the other user has initialized the subsequent incoming call to the user. The method further includes, when the computing device is waiting for the user to indicate acceptance of the subsequent call: causing, in response to determining that the other user has initialized the subsequent incoming call to the user, the interface of the computing device to present or omit the first content data and/or the second content data, at least based on the third assigned priority and the fourth assigned priority.

These and other implementations of the technology disclosed herein can include one or more of the following features.

In some implementations, the engagement data is based on one or more gestures received at the interface of the computing device when the interface of the computing device is providing the first content data and the second content data.

In some implementations, the amount of engagement exhibited by the user when the interface of the computing device provided the first content data is based on a first gesture of the one or more gestures, and the other amount of engagement exhibited by the user when the interface of the computing device provided the second content data is based on a second gesture of the one or more gestures. In some versions of those implementations, the method further includes determining that the first gesture caused the first content data to be provided at the interface of the computing device for a longer period of time than the second gesture caused the second content data to be provided at the interface of the computing device. In those versions, the third assigned priority is prioritized over the fourth assigned priority at least based on the first content of data being provided at the interface of the computing device for a longer period of time than the second content data.

In some implementations, the method further includes accessing, before determining the content for provisioning to the user, data that at least characterizes one or more features of a context of a user. In some of those implementations, the content is determined based on the one or more features of the context of the user.

In some implementations, determining the third assigned priority for the first content data and the fourth assigned priority for the second content data includes: providing, to one or more trained machine learning models, input data that is based on the first content data and the second content data; and generating, based on output data generated by processing the input data using the one or more trained machine learning models, the third assigned priority and the fourth assigned priority. In some of those implementations, the method further includes causing the one or more trained machine learning models to be further trained based on the engagement data and the other engagement data.

In some implementations, a method implemented by one or more processors is provided and includes generating first pre-call content for provisioning at an interface of a computing device when a user is receiving, via the computing device, an incoming call from another user. The first pre-call content is based on data that resulted from the user engaging in an activity that is associated with the other user. The method further includes determining, subsequent to generating the first content data, that the user has engaged in another activity, where the other activity is also associated with the other user and resulted in other data being generated. The method further includes generating, based at least on the other data that resulted from the user engaging in the activity, second pre-call content in furtherance of provisioning content at the interface of the computing device when the user is receiving, via the computing device, the incoming call from the other user. The method further includes determining, subsequent to generating the second pre-call content, that the other user has initialized a call to the user via a wireless communication protocol. The method further includes, when the computing device is waiting for the user to indicate acceptance of the call: causing, in response to determining that the other user has initialized the call to the other, the computing device to present the first pre-call content and/or the second pre-call content at the interface of the computing device.

These and other implementations of the technology disclosed herein can include one or more of the following features.

In some implementations, generating the first pre-call content includes: providing, based on the data, an input to a trained machine learning model, where the first pre-call content includes a synopsis of the data and the synopsis is generated based on an output generated based on processing the input using the trained machine learning model. In some of those implementations, generating the second pre-call content includes: processing the other data using the trained machine learning model to generate another output based on the other data, where the second pre-call content includes another synopsis of the other data and is generated based on the other output of the trained machine learning model.

In some implementations, the first pre-call content corresponds to a first assigned priority and the second pre-call content corresponds to a second assigned priority, and the activity and the other activity are temporally distinct activities.

In some implementations, the method further includes, when the computing device is waiting for the user to indicate acceptance of the call: determining, based on the first assigned priority and the second assigned priority, whether to cause the interface of the computing device to prioritize a position of the first pre-call content over another position of the second pre-call content.

In some implementations, the interface of the computing device includes an audio interface and causing the computing device to present the first pre-call content and/or the second pre-call content at the interface of the computing device includes: causing the interface to render audio corresponding to the first pre-call content and/or the second pre-call content when the computing device is waiting for the user to indicate acceptance of the call.

In some implementations, the other user initialized the call via another computing device, and the method further includes, when the computing device is waiting for the user to indicate acceptance of the call: determining, in response to determining that the other user has initialized the call to the other, whether to cause the interface of the computing device to present any pre-call content.

In some implementations, the activity corresponds to the user interacting with an application and the other activity corresponds to the user interacting with another application that is different from the application.

In some implementations, the method further incudes: determining, subsequent to causing the computing device to present the first pre-call content and/or the second pre-call content at the interface of the computing device, that the user has elected to not accept the call; and causing, based on determining that the user elected not to accept the call, third pre-call content to be generated, wherein the third pre-call content is presented via the interface of the computing device when the computing device is waiting for the user to indicate acceptance of a subsequent call from the other user.

We claim:

1. A method implemented by one or more processors, the method comprising:
    determining that multiple instances of data, of a first user, correspond to a second user, wherein the multiple instances of data include a first instance of data that characterizes an interaction between the first user and the second user from a first application of a client device of the first user and a second instance of data that characterizes a correspondence between the first user and the second user from a second application, of the client device, that is different from the first application, wherein the first instance of data comprises message data;
    in response to determining that the multiple instances of data correspond to the second user:
        generating pre-call content for rendering at an interface of the client device when the first user is receiving an incoming call from the second user, wherein generating the pre-call content comprises:
            causing the multiple instances of data to be processed by a trained machine learning model to generate output that reflects a synopsis of the multiple instances of data, and
            including the synopsis, reflected by the output, in the pre-call content, wherein the synopsis comprises at least a portion of the message data;
        determining that the second user has initialized a call to the first user via a wireless communication protocol; and
    in response to determining that the second user has initialized the call and when the client device is waiting for the first user to indicate acceptance of the call:
        causing the client device to render the pre-call content at the interface of the client device.

2. The method of claim 1, wherein the first application is one of a calendar application, a chat application, and a web browser application, and wherein the second application is a separate one of the calendar application, the chat application, and the web browser application.

3. The method of claim 1, wherein the first instance of data from the first application includes a message that is from the second user and that is directed to the first user.

4. The method of claim 3, wherein the second instance of data from the second application includes an additional message that is from the second user and that is directed to the first user.

5. The method of claim 3, wherein the second instance of data includes a calendar entry in which the second user is identified as an invitee.

6. The method of claim 1, wherein the first instance of data includes a calendar entry in which the second user is identified as an invitee.

7. The method of claim 1, wherein said generating the pre-call content occurs prior to determining that the second user has initialized the call to the first user.

8. The method of claim 7, wherein the pre-call content is cached locally at the client device prior to determining that the second user has initialized the call to the first user.

9. The method of claim 1, wherein the interface of the client device includes an audio interface and causing the client device to render the pre-call content at the interface of the client device includes:
    causing the audio interface to render audio corresponding to the pre-call content.

10. The method of claim 1, wherein the interface of the client device includes a display interface and causing the client device to render the pre-call content at the interface of the client device includes:
    causing the display interface to render graphical content corresponding to the pre-call content.

11. A client device comprising:
    microphones;
    a display interface;
    memory storing instructions;
    one or more processors operable to execute the instructions to:
        determine that multiple instances of data, of a first user, correspond to a second user, wherein the multiple instances of data include a first instance of data that characterizes an interaction between the first user and the second user from a first application of the client device and a second instance of data that characterizes a correspondence between the first user and the second user from a second application, of the client device, that is different from the first application, wherein the first instance of data comprises message data;
        in response to determining that the multiple instances of data correspond to the second user:
            generate pre-call content for rendering at the display interface of the client device when the first user is receiving an incoming call from the second user, wherein in generating the pre-call content one or more of the processors are to:
                cause the multiple instances of data to be processed by a trained machine learning model to generate output that reflects a synopsis of the multiple instances of data, and
                include the synopsis, reflected by the output, in the pre-call content, wherein the synopsis comprises at least a portion of the message data;
        determine that the second user has initialized a call to the first user; and
        in response to determining that the second user has initialized the call and before acceptance of the call has been indicated at the client device:
            cause rendering the pre-call content at the display interface.

12. The client device of claim 11, wherein the first application is one of a calendar application, a chat application, and a web browser application, and wherein the second application is a separate one of the calendar application, the chat application, and the web browser application.

13. The client device of claim 11, wherein the first instance of data from the first application includes a message that is from the second user.

14. The client device of claim 13, wherein the second instance of data from the second application includes an additional message that is from the second user.

15. The client device of claim 13, wherein the second instance of data includes a calendar entry in which the second user is identified as an invitee.

16. The client device of claim 11, wherein the first instance of data includes a calendar entry in which the second user is identified as an invitee.

17. The client device of claim 11, wherein said generating the pre-call content occurs prior to determining that the second user has initialized the call to the first user.

18. The client device of claim 17, wherein the pre-call content is cached locally at the client device prior to determining that the second user has initialized the call to the first user.

19. The client device of claim 11, wherein the client device further includes an audio interface and wherein at least one of the one or more of the processors are further to, in response to determining that the second user has initialized the call and before acceptance of the call has been indicated at the client device, cause the pre-call content to be rendered at the audio interface.

* * * * *